United States Patent [19]
Scott et al.

[11] 4,080,658
[45] Mar. 21, 1978

[54] SYSTEM FOR MAINTAINING BELOW RANGE SYNCHRONIZATION IN ERROR CORRECTING APPARATUS

[75] Inventors: Larkin B. Scott, Fort Worth, Tex.; John J. J. Staunton, Oak Park, Ill.

[73] Assignee: Perkin-Elmer Corporation, Norwalk, Conn.

[21] Appl. No.: 763,041

[22] Filed: Jan. 31, 1977

Related U.S. Application Data

[62] Division of Ser. No. 654,704, Feb. 2, 1976.

[51] Int. Cl.² .............................................. G01J 3/42
[52] U.S. Cl. .................................... 364/571; 364/525; 356/97; 73/1 R
[58] Field of Search .................. 235/151.35, 151.3; 356/96, 97; 73/190 R, 1 R; 364/200

[56] References Cited

U.S. PATENT DOCUMENTS

| | | | |
|---|---|---|---|
| 3,634,868 | 1/1972 | Pelavin et al. | 73/1 R X |
| 3,641,444 | 2/1972 | Watts | 73/190 R X |
| 3,646,331 | 2/1972 | Lord | 356/96 X |
| 3,681,577 | 8/1972 | Gasiunas | 73/1 R X |
| 3,695,764 | 10/1972 | Delmas et al. | 235/151.35 X |
| 3,734,621 | 5/1973 | Moody et al. | 356/97 X |
| 3,886,331 | 5/1975 | Schierer, Jr. | 356/96 X |
| 3,935,436 | 1/1976 | Holschlag | 235/151.35 |
| 3,986,776 | 10/1976 | George | 356/96 X |
| 4,013,364 | 3/1977 | Nakano et al. | 356/96 X |

*Primary Examiner*—Edward J. Wise

[57] ABSTRACT

In an error correcting system in which error corrections for each of a plurality of steps of an independent variable in a device which has an error dependent upon the independent variable are stored in a register in adjacent storage positions thereof and wherein a location marker differing from any stored correction value is also stored in the register and moved as said device steps so as to always be adjacent the correction corresponding to the step of the device, the correction values being stored for a range of the device between a first limit and a second limit, the device having a greater overall range than the range between said first and second limit and being able to go to a position below said first limit, loss of synchronization between the device and the location marker when the device is moved below said first limit is prevented by detecting when said location marker reaches said first limit and causing it to move in a direction from said first limit toward said second limit as said device is moved below said first limit and in a direction toward said first limit as said device is moved from below said first limit back toward said first limit and again reversing the direction of movement of said location marker when said first limit is again reached with said independent variable moving in a direction toward said second limit permitting synchronization to be maintained even when going below the range for which correction values are stored.

8 Claims, 22 Drawing Figures

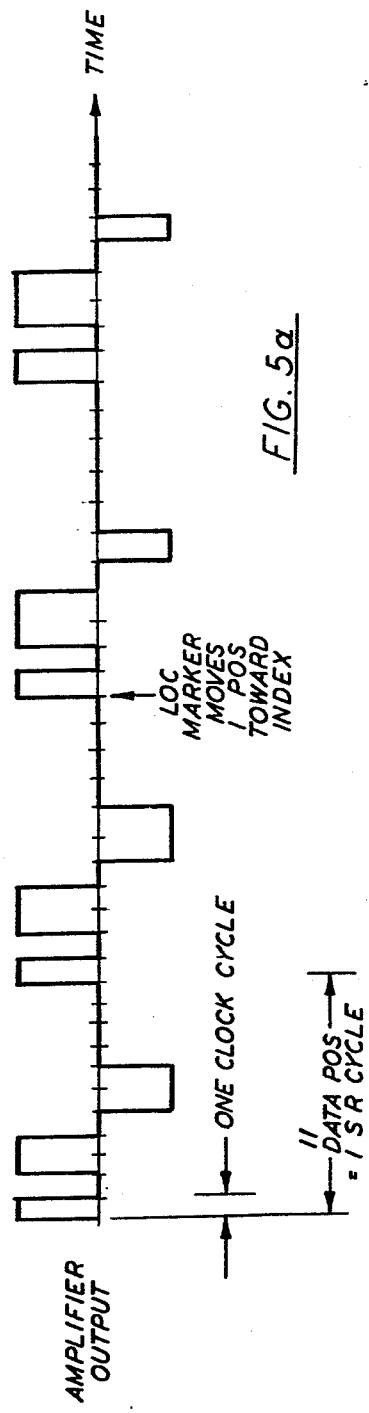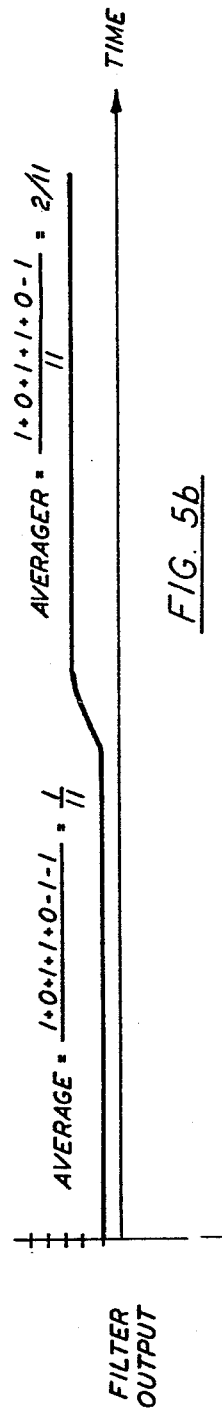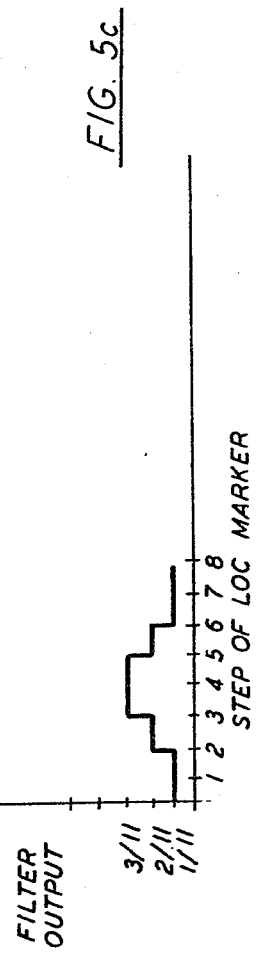

SYSTEM FOR MAINTAINING BELOW RANGE SYNCHRONIZATION IN ERROR CORRECTING APPARATUS

RELATED APPLICATIONS

This application is a division of application Ser. No. 654,704 filed Feb. 2, 1976.

BACKGROUND OF THE INVENTION

This invention relates to a method and apparatus for correcting an error which is a function of an independent variable such as errors in analytic instruments in general and more particularly to an improved system for maintaining below range synchronization in such apparatus.

Various types of analytic instruments have a base line which varies with a change in an independent variable. Furthermore, certain instruments have errors which change not only as a function of the independent variable but which also change over periods of time, with temperature, etc. This is a particular problem in instruments such as dual beam spectrophotometers. It is also a problem in scanning calorimeters. In the first case, an output signal error must be corrected synchronously with changes in wavelength. In the second case, corrections must be made to the output as the independent variable of temperature changes. In order to gain a better understanding of the present invention it will be disclosed in terms of a dual beam spectrophotometer. It will be understood by those skilled in the art that it may be as easily used with any type of instrument or device in which an error which is a function of an independent variable occurs.

In a dual beam spectrophotometer the concentrations of various constituents in sample substances are determined. To accomplish this two radiation beams from a single source are sequentially directed to a photo-electric detector. One of the beams, whose signal is designated I, passes through the sample. The other signal, designated $I_0$ does not pass through the sample but provides a reference. The I beam which is passed through the sample experiences a decrease in intensity due to absorption by the constituent in proportion to its concentration in the sample. Ideally, except for the absorption by the sample, the I and $I_0$ beam have equal intensity throughout their transmission paths. This is commonly expressed as a ration $I/I_0 = 100\%$. However, the paths never include exactly the same optical elements since it is impossible to exactly match the reflectivity of the uncommon elements for all wavelengths of the source. In a spectrophotometer wavelengths are scanned in increments, the instrument stepping through the various wavelengths. There are variations in the transmission at each of these wavelengths. Without a correction, the base line, i.e, the zero line from which intensity is measured, is not flat and erronous results are obtained. This is a problem which has been recognized in the art and is referred to as a base line flattening problem. Various attempts have been made to solve this problem through the use of cams, tapped potentiometers or even through the use of the magnetic tape as a medium for storing the $I_0$ correction factor which varies in synchronism with changes in wavelength. The cam and tapped potentiometer methods are tedious to adjust and force the user to accept predetermined inflection points not too closely spaced with respect to wavelength function. The magnetic tape method is capable of automatically finding or adjusting the correction function and has no restriction on the occurrence of inflection points. However, it is an expensive method in view of the requirements for synchronizing the tape drive to the wavelength drive in the instrument.

Co-pending application Ser. No. 654,704 describes and claims an improved error correcting system for use in such applications.

It discloses a device in which an independent variable is stepped or scanned between a first limit and second limit and in which device there is an error which is a function of the independent variable. It provides a manner of correcting that error by storing correction values for each of a plurality discrete steps of the independent variable, establishing a location marker which can be identified as different from the error correction data and by moving the location marker so that it is always adjacent the error correction for the current position or current step of the independent variable. The data adjacent the location marker is then read out to provide the correction.

Preferably, the data is stored in digital form in a shift register or similar device with the bit pattern of the location marker different than any data bit pattern corresponding to an error correction value.

In the preferred embodiment of the co-pending application in addition to the location marker, an index marker having a pattern different from the location marker and also different from any data pattern is also provided. The location marker, at one end or one limit is placed one data position away from the index marker and is moved further away from the index marker as the independent variable is stepped toward the second limit and toward the index marker when the independent variable is stepped in a direction from the second limit toward the first limit.

In order to attain the maximum amount of correction with the minimum of amount of hardware, preferably only incremental changes in error are stored. This permits two bits to comprise each storage position or location with a "1 0" indicating a change in the positive direction, a "0 1" an incremental change in the opposite direction and a "0 0" indicating no change. This also permits establishing a location marker as the bit pattern "1 1" and the index marker as a bit pattern "1 1, 1 1" taking up two storage positions. A storage position is defined as the number of bits necessary to store the correction for one step of the independent variable.

In the disclosed system, calibration may be done between first and second limits which do not correspond to the full range of the device. Thus, after calibration, operation below the calibrated range is possible. Thus, there is a need to insure that synchronization is maintained when going below the calibration range.

SUMMARY OF THE INVENTION

The present invention provides an apparatus for maintining the synchronization below the calibration range.

In an error correcting system in which error corrections for each of a plurality of steps of an independent variable in a device which has an error dependent upon the independent variable are stored in a storage means in adjacent storage positions thereof and wherein a location marker differing from any stored correction values is also stored in said storage means and moved as said device steps so as to always be adjacent the correction corresponding to the step of the device said correction values being stored for a range of the device between a first limit and a second limit, the device having a greater overall range than the range between said first and second limit and being able to go to a position below said first limit, a loss of synchronization between the device and the location marker if the device is moved below said first limit by steps is prevented by detecting when said location marker reaches said first limit and causing it to move in a direction from said first limit toward said second limit as said device is moved below said first limit and in a direction toward said first limit as said device is moved from below said first limit back toward said first limit and again reversing the direction of movement of said location marker when said first limit is again reached with said independent variable moving in a direction toward said second limit whereby synchronization will be maintained even when going below the range for which correction values are stored.

BRIEF DESCRIPTION OF THE DRAWINGS

FIGS. 5a, 5b and 5c are waveform diagrams representing the output of the system.

DETAILED DESCRIPTION OF THE INVENTION

Figure 1:
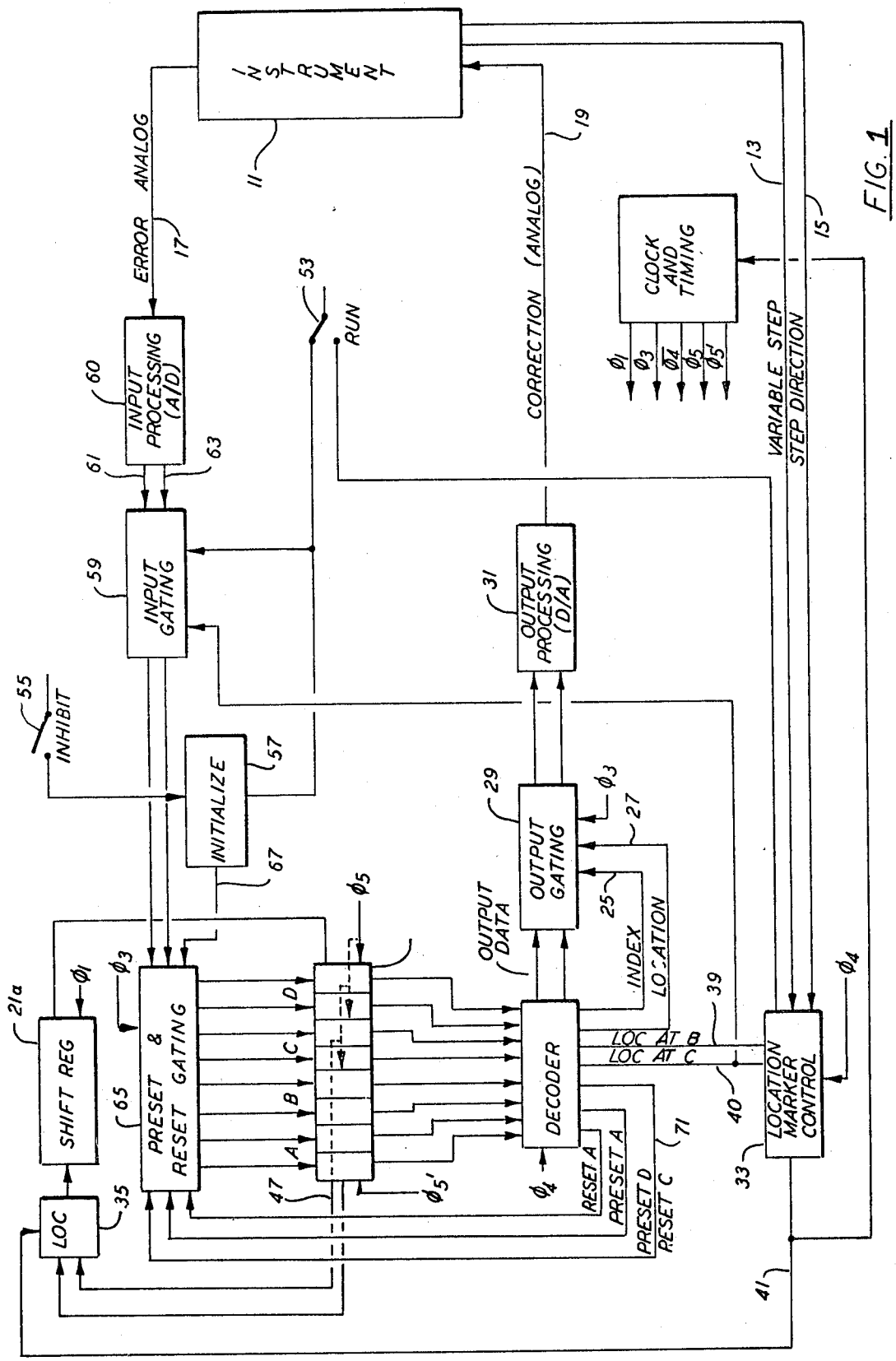
FIG. 1 is an overall block diagram of a system utilizing the present invention.

FIG. 1 is a block diagram of one embodiment of the present invention. Shown is an instrument 11 which will be assumed, for the purposes of this disclosure, to be a spectrophotometer. As pointed out above, the present invention is equally applicable to other instruments and devices. In general terms, in any case where an independent variable is scanned or stepped and the device exhibits an error characteristic which is a function of the independent variable, the present invention may be used.

As is well known by those skilled in the art, a scanning spectrophotometer may include a stepper motor which steps a grating to cause a range of wavelengths to be scanned. In a dual beam spectrophotometer the beam is directed over two separate optical paths into one of which is interposed the sample to be analyzed. The other path is free and gives a reference value of intensity. The measured intensity is designated I and the reference intensity $I_0$. Ideally, with no sample in the path, the intensity of the two beams as detected at a detector should be equal. However, because the optics cannot be perfectly matched there will be an error which is dependent upon the independent variable wavelength, i.e., the optics respond differently at different wavelengths. The stepper motor for stepping through the various wavelengths is supplied with pulses indicating the occurrence of a step and a signal indicating the step direction. For use in the present system, these signals are picked off the instrument on lines 13 and 15 respectively. The instrument will also include a photoelectric detector and additional circuitry, some of which will be shown in more detail below, from which an analog signal proportional to the ratio $I/I_0$ can be obtained. As indicated above, with no sample it should be one. Means are included to develop a signal indicating the deviation of this ratio from one, i.e. the base line error. This siganl is shown as being taken off the instrument on line 17. In addition, provisions are made in the instrument to add an analog correction signal to the output of the detector. This signal is provided to the instrument on line 19.

The embodiment of the invention shown on FIG. 1 is basically capable of operating in three different modes. These include a calibrate mode, a re-calibrate mode and a run mode. Since implementations of the invention which do not require the calibrate mode are possible, the operation of the present invention in the run mode will first be described. For this purpose, it wll be assumed that the necessary correction for each step of the independent variable in the instrument 11 is known. These corrections are stored in a circulating shift register including a portion 21a and a portion 21b. Each set of correction data for a step of the instrument is assigned a predetermined number of bits positions in the shift register, hereinafter sometimes referred to as date storage positions or locations. In the example shown, each storage position will be assumed to include two bits. As will be more fully explained below, the present embodiment operates in an incremental manner so that one bit of the two bits per storage location represents a positive increment and the other bit a negative increment. Naturally, if desired, each storage position may include more bits. Also stored in the circulating shift register is an index marker and a location marker. Both the index marker and location marker must constitute a bit pattern different than that of any correction. In the present example, since for a correction there will be binary "1" in only one of the two bits of a storage position, the location marker comprises binary "1s" in both bits and the index marker is made up of binary "1s" in both bits of two adjacent storage positions. The instrument is moved to a starting position of the independent variable corresponding to the first storage position. With the instrument 11 at a first limit or starting position, which need not be an end or limit of the instrument, the data and index marker and location marker are stored in the shift register 21a and 21b in the manner shown by the example of FIG. 2a. The index marker is in the positions A-A' and B-B'. Since there are two bits in each position, they have been shown as one above the other. As will be evident from the detailed circuit diagram given below, in actuality, the positions are implemented with two parallel shift registers. In the position C-C' is the first correction data corresponding to the first or starting step of the instrument. Next to it is the location marker followed by additional data for further steps of the instruments. Only eight sets of such data are shown. The same information stored in D-D' is also stored in E-E' for reasons to become more apparent below. Thus, there is an overlap of one bit position between shift register section 21a and section 21b. At other times in the timing cycle, data section A-A and L-L' overlap. It will be recognized that the shift register 21a will have a much greater capacity than that shown. For example, in the embodiment to be described below, 1027 bits in each of two parallel shift registers are used to permit that many steps of the instrument.

Figure 2A:
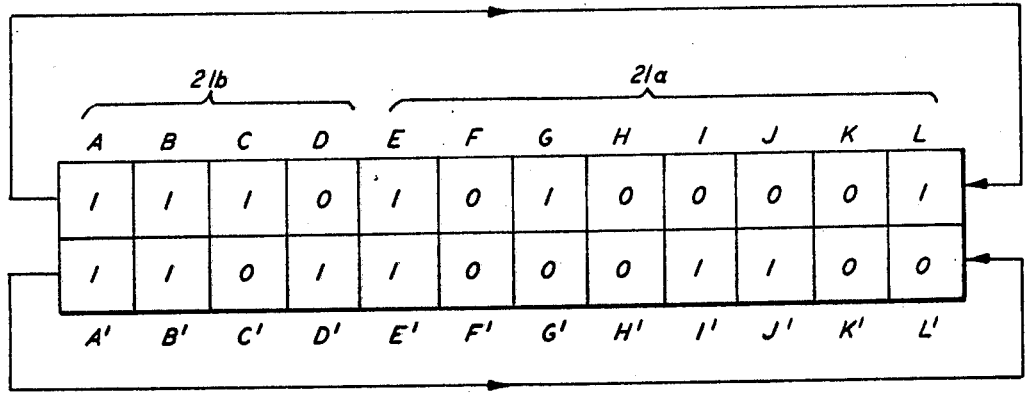
FIGS. 2a-2p are diagrammatic representations of the data in the shift registers of FIG. 1 as various operations are carried out in the system.

Referring to FIG. 1 and FIG. 2a, the shift register is clocked at a rate of, for example, one megahertz such that the data shown on FIG. 2a continuously circulates in the direction of the arrows. The bits within the shift register 21a are not accessible. However, the bits indicated at positions A, B, C and D on FIG. 1 are accessible. They are accessible both in terms of reading out the data in each location and in terms of being able to preset or reset data in each of the shift register locations. The outputs of the shift register sections A, B, C and D, both 5 bits in each, are inputs to a decoder 23. The decoder is capable of detecting the presence of the index in two of the sections A–D and providing an output on line 25 indicative thereof. Similarly, it is capable of detecting the location marker and providing an output indication on line 27. Output data from the section B of the register, for example, is coupled through the decoder to an output gating module 29. The output gating module is enabled from the time of the index output on line 25 until the time of the location output on line 27 during each circulation of the shift register. With the arrangement of FIG. 2a it will thus be enabled only during the time when the correction data shown on that figure in C–C' is available. Since the instrument is at the first step, this is the proper correction. This correction is provided to an output processing module 21 where it is converted to an analog value and provided on line 19 to the instrument. It must be kept in mind that the registers 21 and 21a are continuously circulating and that each time the index marker passes a predetermined location the output gating will be enabled, the data stored in the register between it and the location marker provided as an output, processed and supplied to the instrument. Thus, it is necessary that the output processing include some sort of integrating or filtering means, in particular means which can hold the value between outputs so as to maintain a continuous proper output to the instrument. Preferred means will be described in more detail below.

Figure 2B:
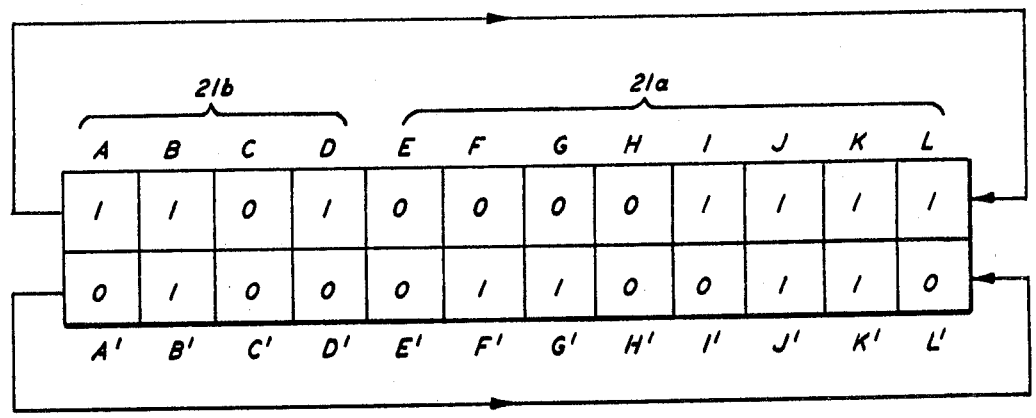

When the instruments steps, in this case steps ahead since it is at its beginning point, a signal indicative of that step will appear on line 13. The signal on line 15, in this particular case, will indicate that the step is in the forward direction. These two signals are provided to a location marker control module 33 the output of which is coupled to a location jump module 35 interposed between the shift register section 21a and the shift register section 21b. Additional inputs to location marker control 33 are outputs from decoder 23 indicating that the location marker is in position B and that it is in position C. It is essential that each time a step is made that the location marker be moved so as to be adjacent to the position of the correction value corresponding to the step of the instrument just made. The manner in which this is accomplished in the system of the present invention can best be understood with reference to FIGS. 2a–e and the timing diagram of FIG. 3 along with the block diagram of FIG. 1.

A clock and timing module 37 provides five different output signals. The signal designated $\phi_1$ is the signal which clocks the shift register section 21a. The output $\phi_3$ is used for gating output data and will be explained below. The output $\overline{\phi_4}$ is used in the decoder gating. The signal $\phi_5$ is provided as an input to the three sections or stages B, C and D of the shift register 21b and the signal $\phi'5$ to the stage A of the shift register. The relationship between the timing signals is shown on FIG. 3. The timing is illustrated for a case where the shift register 21a is an MOS shift register and the shift register 21b a bipolar shift register. Of course, the whole shift register could be implemented with bipolar devices or, for that matter, any other type of device. The MOS shift register is used simply because of its availability in a small package with sufficient bit capacity. It is because of the gap between $\phi_1$ and $\phi_5$ that an overlap of on position between section 21a and section 21b occurs.

Figure 2C:
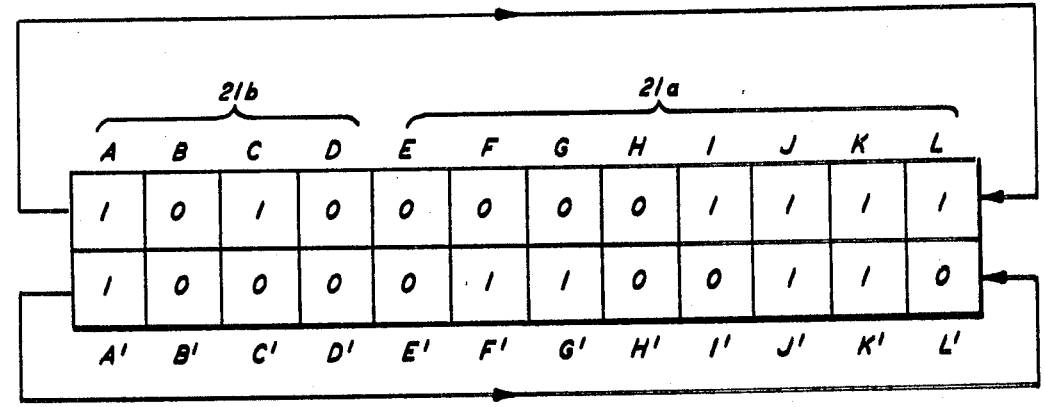
Figure 2D:
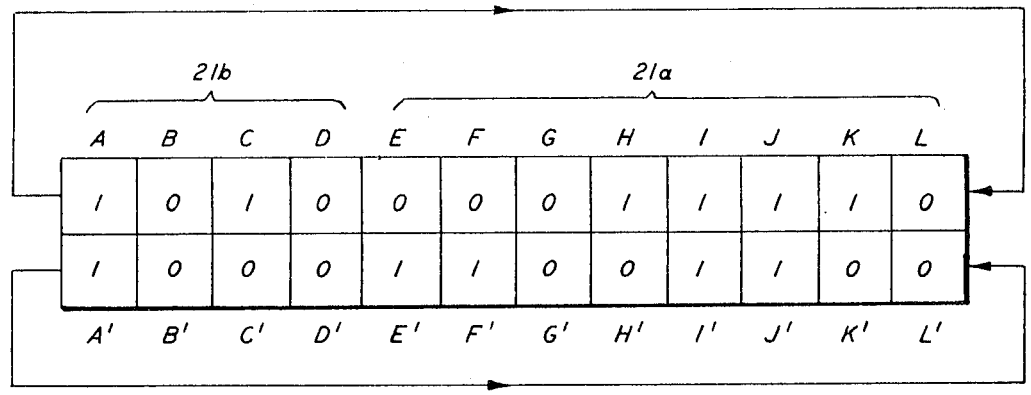
Figure 2E:
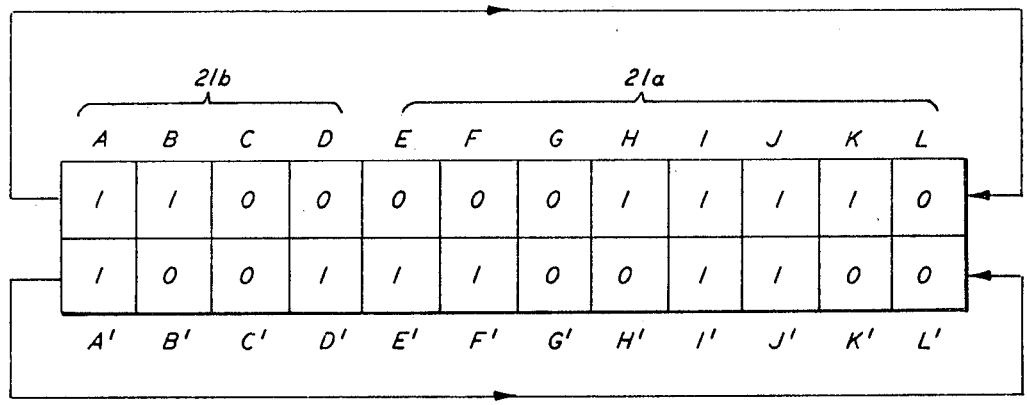
Figure 3:
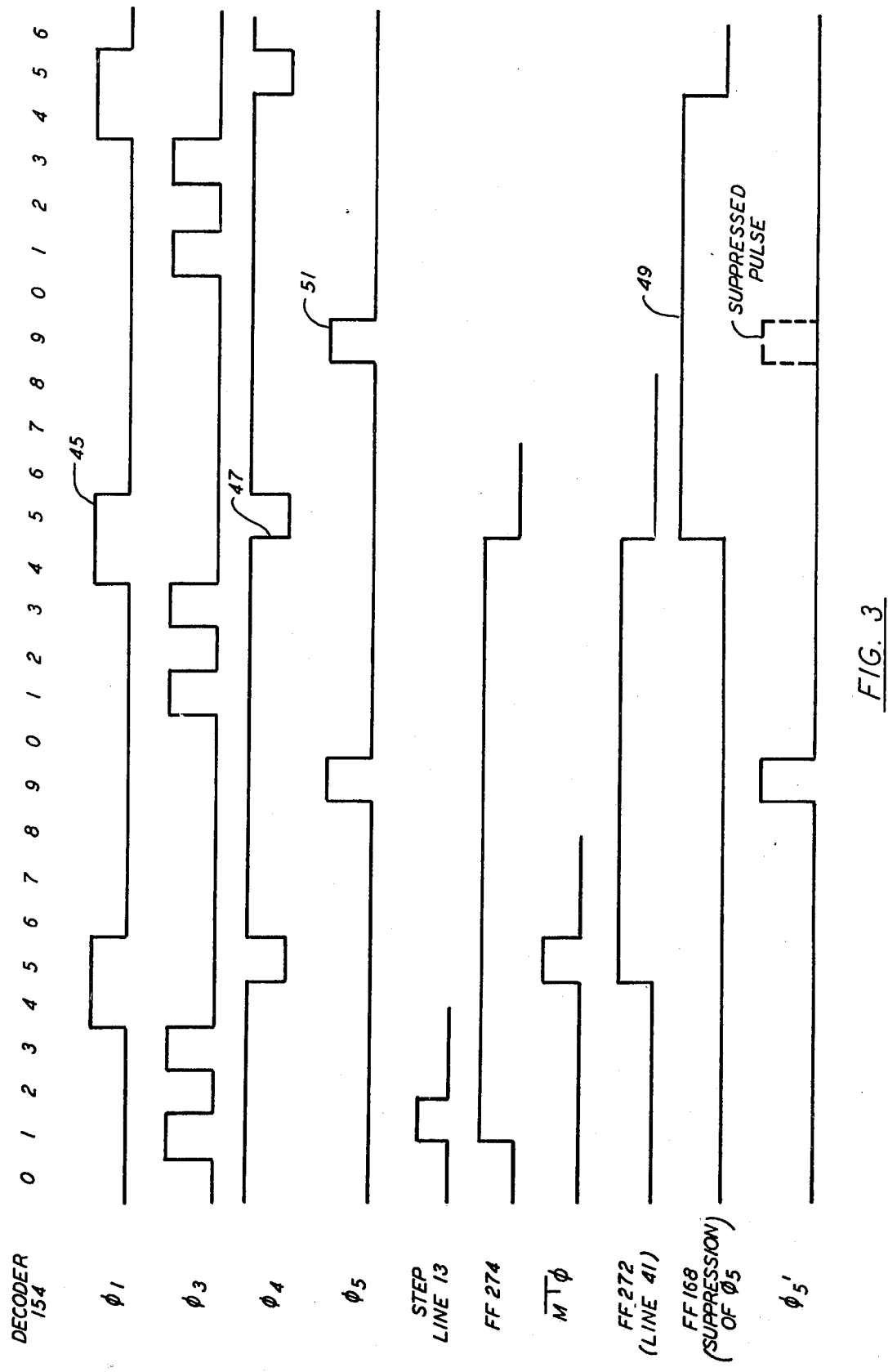
FIG. 3 is a timing diagram of the system of FIG. 1.

Assume that the data in the shift register has been shifted so that the location marker is now in the section B. The configuration would look as shown on FIG. 2b after a shift of data in section 21a, i.e., after the first $\phi_1$ pulse of FIG. 3. Decoder 23 will provide an output on line 39 indicating that the location marker is at B. Upon the occurrence of the $\overline{\phi_4}$ signal, location marker control 33, having previously stored the indication of a step, will now provide an output on line 41 to location jump module 35. At the same time this output is coupled into clock and timing module 37. The signal on line 41 is maintained for one clock cycle. The next thing which happens is the occurrence of the $\phi_5$ signal. At the same time the phase $\phi'_5$ signal also occurs. These two signals are the same except that the $\phi'_5$ signal is subject to suppression. With the $\phi_5$ signal the data is shifted in each of the sections of shift register 21b to take on the configuration on FIG. 2c. Now the location marker is stored in A–A'. The next thing to occur in time is the $\phi_1$ pulse 45. Data is read in and out of the stages of shift register section 21a on this pulse. The signal on line 41 enables appropriate gates in location jump module 35 to cause the output on line 47, which is coupled to the B section of shift register 21b to be shifted into the shift register 21a. Thus, the data stored in the B–B' of FIG. 2c is shifted into the first location of shift register 21a. The configuration now appears as shown on FIG. 2d. The same data which was shifted is still also in the B section since the signals $\phi_5$ and $\phi'_5$ have not yet occurred to cause a shift in the portion 21b of the shift register. When the next $\overline{\phi_4}$ signal 47 appears, it acts to generate a suppression signal 49 and at the same reset the signal on line 41. This occurs within clock timing module 37 and suppresses the next pulse $\phi'_5$. The result is that when the next pulse $\phi_5$, pulse 51, occurs, the configuration will be as shown in FIG. 2e. In effect, the data which was in location B of FIG. 2c has jumped over the location marker. Put another way, the location marker has been moved back one so it is now adjacent the next correction value. Each time there is step forward, the same thing happens. At all other times, with the signal 41 not present, the data from the section A of the shift register 21b is loaded into the shift register 21a and the same data continually circulates.

The location marker is also moved if the instrument 11 is stepped backwards. In such a case, the step direction signal causes location marker control 33 to generate the signal on line 41 when it detects the location marker at C. In this case, instead of data jumping over the location marker, the location marker jumps over the data. When it is time to read into the memory section 21b the location marker will be in the location B. Since the gates in location jump module 35 are now enabled to read the data from the section B into shift register 21a the location marker will be read in and will, in effect, jump the data in location A. On the next $\phi_5$ clock signal for advancing the shift register 21b the signal $\phi'_5$ will be suppressed and new data will be shifted into the location B. In other words, in a reverse direction, starting with the condition FIG. 2b, the location marker will jump over to location L and in effect move one position to the left. Thus, it always remains in synchronism with the steps of the instrument. Because of this, it is possible at all times, with the data constantly circulating, to enable the output gating at the time when the index marker is encountered and disable it when the location marker is encountered to thereby get an output which is the average of all incremental changes which will correspond to the necessary correction for the present location of the instrument independent variable.

Figure 2G:
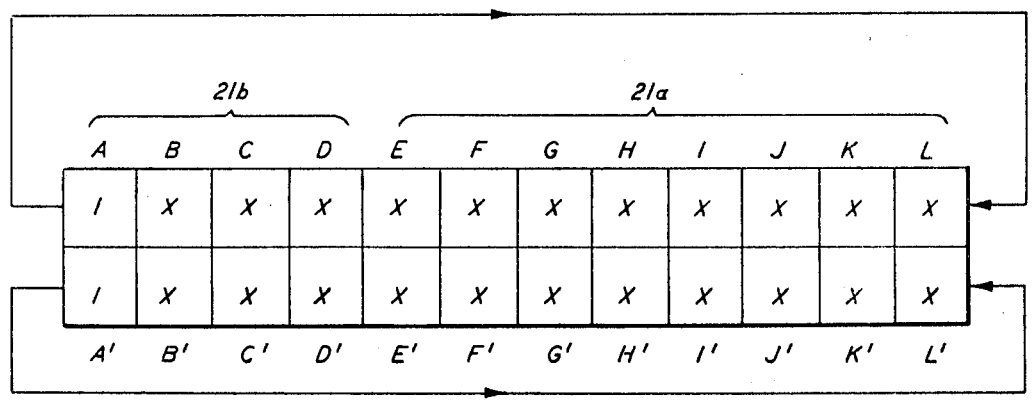
Figure 2H:
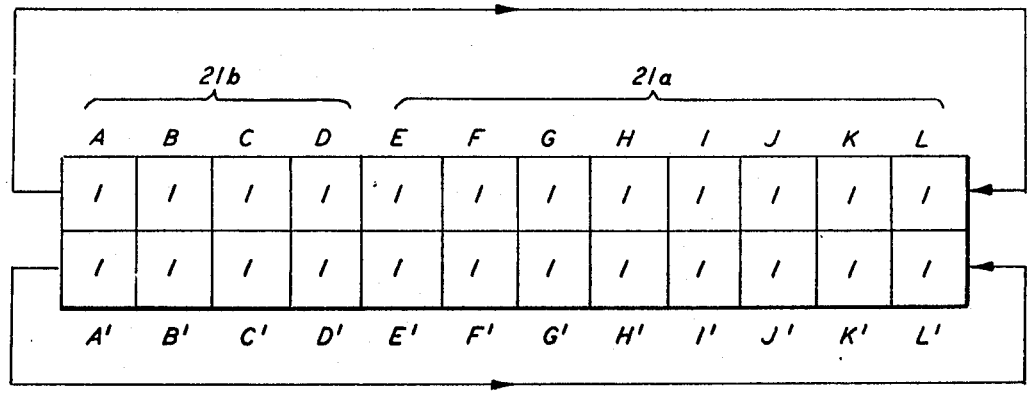
Figure 2I:
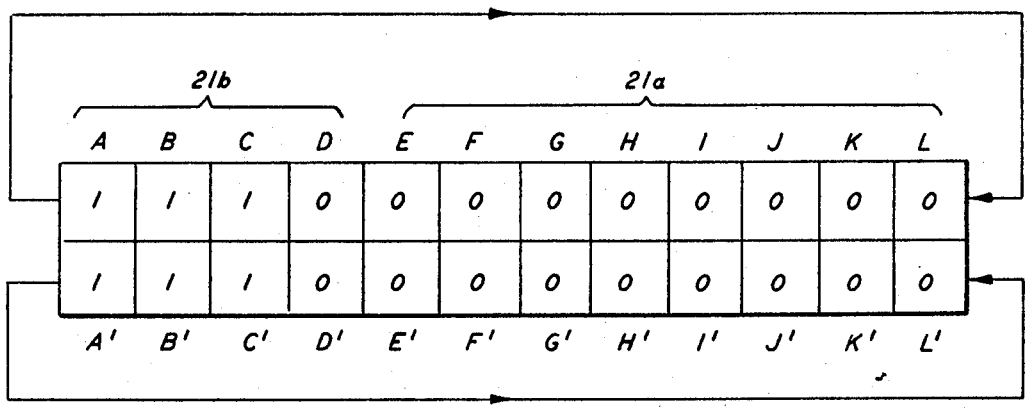

Because the memories used will generally be of a type which will lose the data when the machine is shut down, and, furthermore, in view of the fact instruments such as spectrophotometers can have errors which change with time due to temperature changes etc., means are provided to initialize and calibrate the system each time the instrument is turned on. To initialize and calibrate a switch 53 is placed in the calibrate position and a switch 55 left open as shown. Switch 53 enables an initialize block 57 to output a signal on line 67 to preset and reset gating module 65 which then outputs a signal which causes binary "1s" to be preset in both A and A'. Thus, the configuration shown on FIG. 2g will result where the Xs indicate that the data stored in the other locations does not matter. The signal continues to preset "1s" into the A-A' positions so that after the shift register has circulated once, it will be filled with "1s". This situation is indicated by FIG. 2h. At that time the decoder 23 detects this situation and puts out a signal on line 69 to preset and reset gating 65 to reset A-A' to "0s". It will reset A-A' to "0s" for as long as the sections B-B', C-C' and D-D' contain all "1s". Thus, it will continue to set "0s" into the A locations, which will then be shifted into the shift register 21a, until the first of the 0s" get back to the locations D. This situation is illustrated in FIG. 2i. When this configuration is detected, a signal is provided on line 71 directing that the C-C' locations be reset and the D-D' locations be preset to obtain the configuration shown in FIG. 2j. This is the same configuration which was shown on FIG. 2a as the starting point for running with data loaded and the instrument at a limit position. Once initialized with the instrument at the point where calibration is to start, data is loaded in, always at the B-B' positions by presetting and resetting the B and B' storage locations. As indicated, line 40 which gives an indication that the index is at C is used as an enabling signal for input gating 59. Thus, after one shift from the position shown in FIG. 2a or FIG. 2j, two "0s" are in B-B' between the index and the location markers. The input gating 60 is enabled to load into that location whatever signals appear on the lines 61 and 63 from an input processing module 60 which converts the analog error signal on line 17 to a digital signal on lines 61 and 63. The instrument is stepped and the location marker stepped along with it in exactly the manner explained above for operation in the run mode. With each step the error correction for that step is read into the shift register. The instrument is continued to be stepped forward until as much as calibration data as needed is stored. In other words, the instrument is stepped from the position at which it is desired to start operation to the position where it is desired to end operation. In a spectrophotometer this could be the full range of the instrument or only a part of that range. Once the data is stored, the switch 53 can be moved back to the run position and the instrument moved backward and forward with the location marker at all times following the stepping of the instrument. And, as explained above, this makes possible at any time providing as an output the average value between the index marker and the location marker. Furthermore, it should be noted that because the system is calibrated in a closed loop, with the corrections being fed to the instrument during calibration, there does not have to be a strict linear relationship between the analog error input and the correction output. Any non-linearities will be cancelled out because of the closed loop.

The next mode of operation is that of re-calibration. At any step of the instrument a recalibration is possible. If such is desired, the inhibit switch 55 is closed to prevent a reinitialization and the switch 53 placed in the CAL position. This enables the input gating to couple the error from input processing module 60 into the locations B-B' at the time when the index is detected in the C-C' locations. The input gating includes gating to insure that two "1s" are not loaded in B and B'. To accomplish this, the gating resets to "0" the one of the bit positions into which a "1" is not being loaded.

A further feature of the system of the present invention comprises the ability to maintain synchronization even if the instrument is moved below the range where calibration was started. As will be explained more fully with the aid of the detailed drawing of FIG. 4, if in stepping down the configuration shown in FIG. 2i is reached, the direction of movement of the location marker is automatically reversed.

This causes it to be moved away from the index marker as long as the instrument is stepped below the calibration range. When the instrument is again reversed, the location marker continues to move in a direction opposite to which it would normally move, toward the location marker until it reaches the position of FIG. 2i at which time its direction is reversed and normal, calibrated operation takes place again.

Figure 4A:
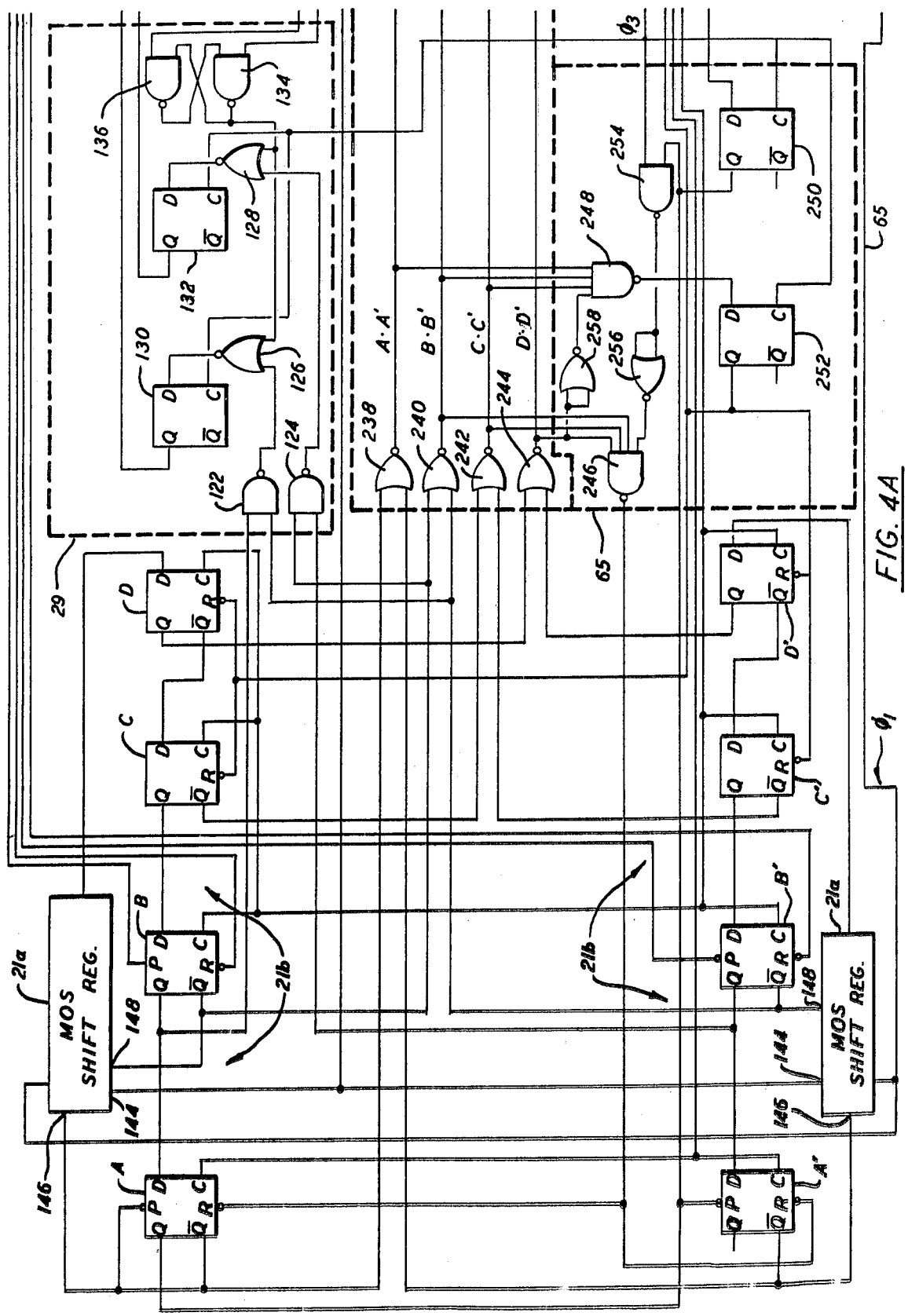
FIGS. 4a and 4b are a logic diagram of the system of FIG. 1.
Figure 4B:
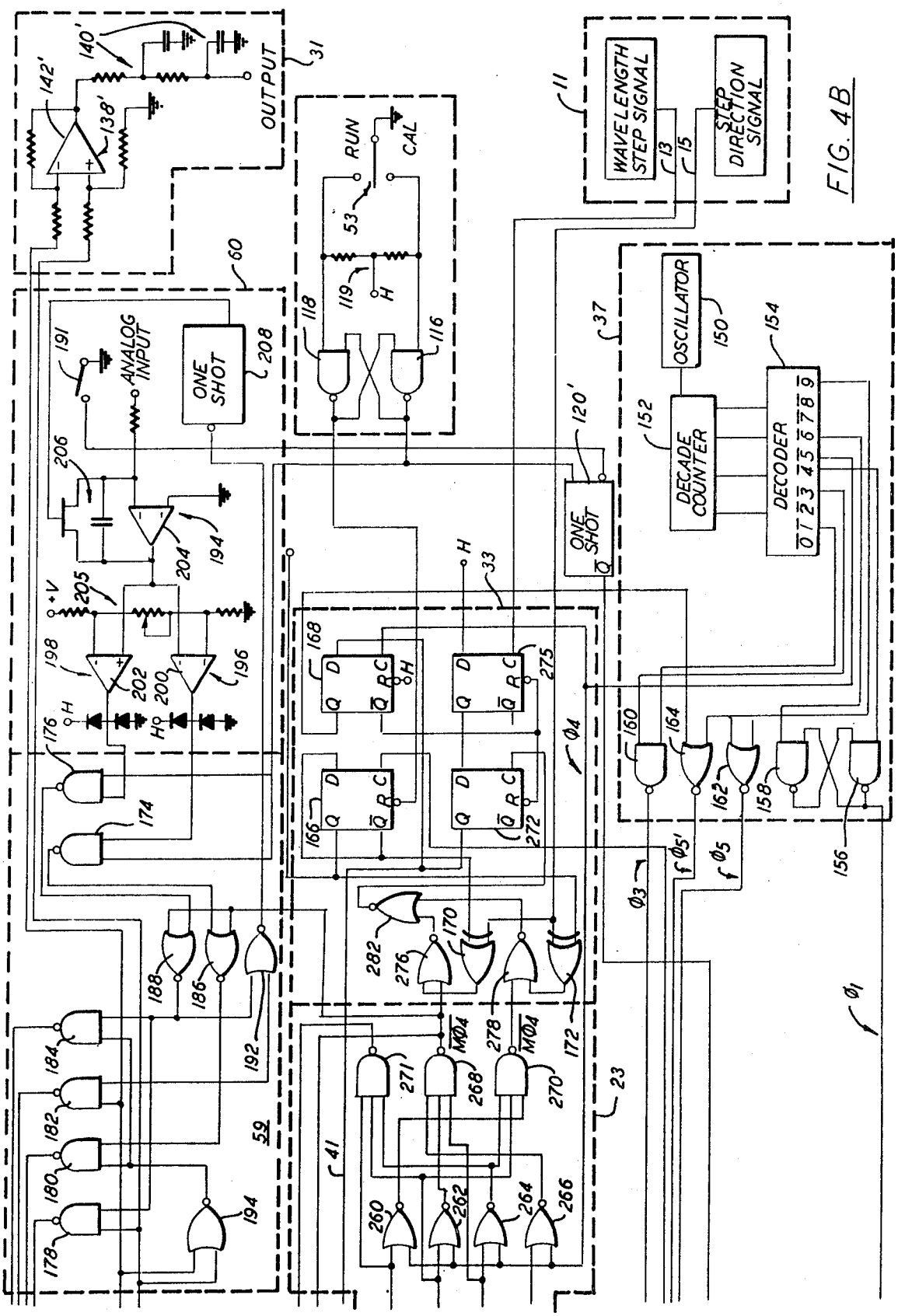

FIGS. 4A and 4B are more detailed logic diagrams of the system illustrated by FIG. 1. Referring to FIG. 4B, which when placed along the right hand side of FIG. 4A makes a single logic diagram, the nature of the clock will first be explained. The clock 37 has as it basic timing element an oscillator 150. In the specific embodiment shown on FIG. 4B the oscillator operates at 10 megahertz. The output of oscillator 150 is the input to decade counter 152 whose output is decoded in decoder 154. The outputs of decoder 154 are used to generate the timing signals $\phi_1$, $\phi_3$, $\phi_4$ and $\phi_5$. The $\phi_1$ signal is obtained from a NAND gate 156. The nature of a NAND gate is such that only when both of its inputs are digital "0's" will it have a "1" output. NAND gate 156 is cross coupled into a latch configuration with NAND gate 158. NAND gate 158 receives an input from the $\bar{6}$ output of decoder 154 and NAND gate 156 an output from the $\bar{4}$ output of decoder 154. Prior to the time when fifth count occurs and the $\bar{4}$ output changes state it will present a "1" to the input of NAND gate 156. With this "1" on the input and another "1" from gate 158, NAND gate 156 has a "0" output which is coupled back to NAND gate 158 causing it to maintain its "1" output when the $\bar{4}$ bit in decoder 154 changes from a "1" to a "0," the output of gate 156 changes from a "0" to a "1". This change results in two "1s" at the input to gate 158 and its output changes to a "0" latching the gate 156 so that when $\bar{4}$ goes back to a "1", there will still be a "0" and a "1" present to maintain its output at "1". This output remains until $\bar{6}$ becomes a "0" at which time the output of gate 158 changes from a "0" to a "1". Now, with two "1" at its input, gate 156 goes back to "0". Thus, the waveform $\phi_1$ shown on FIG. 3 results at the output of gate 156.

The $\bar{9}$ output of decoder 154 is simply fed into both inputs of a NOR gate 162. NOR gate 162 when so configured acts as an inverter. Thus, when $\bar{9}$ goes from a "1" to a "0" on the tenth count, the output of gate 162, the $\phi_5$ signal, goes from a "0" to a "1". The $\overline{\phi_4}$ signal is taken directly from the $\overline{5}$ output of the decoder 154. The $\phi_3$ signal is obtained from the output of a NAND gate 160 having as inputs the $\overline{1}$ and the $\overline{3}$ outputs of decoder 154. Normally, both of these outputs will be "1" and the NAND gate will have a "0" output. However, when $\overline{1}$ becomes a "0" or when $\overline{3}$ becomes a "0" the NAND gate output will go to a "1" as shown on FIG. 3. A NOR gate 164 is used to provide the $\phi'_5$ output. It has as an input the $\overline{9}$ output of the decoder plus an enabling input from a flipflop 168 to be described below. The nature of a NOR gate is such that only when both of its inputs are "0" will it have a "1" output. For every other combination its output is a "0". Thus, in order for NOR gate 164 to have a "1" output when the $\overline{9}$ output from the decoder goes to "0," its second input must be enabled with a "0." Thus, if the flipflop 168 is set the gate 164 will be disabled from providing pulses at its output.

As indicated above, the two bits per storage position are obtained by using two circulating shift registers in parallel. Thus, in FIG. 4A there are shown the stages A – A′, B – B′, C – C′ and D – D′ of shift register portion 21b each operating in series with a shift register 21a. Each of the flipflops used for stages A – A′, B – B′, C – C′ and D – D′ are a D type flipflop. The flipflops have a D input standing for data, a C or clock input, a preset input P and a reset input R. Each flipflop has two outputs designated Q and $\overline{Q}$ in conventional fashion. The nature of these flipflops is such that if they are preset a "1" will appear at the Q output and a "0" at the $\overline{Q}$ output. If reset, a "1" will appear at the $\overline{Q}$ output and a "0" at the Q output. In clocked operation, the data i.e., a "1" or a "0" present at the D input at the time a clock pulse appears on the C input will be transferred to the Q output. The Q and $\overline{Q}$ outputs are always complementary in conventional fashion. Shifting occurs in a direction from D to C to B to A then through the bits of the shift register 21a and back to D. Because of the nature of the clocking the stage D stores the same information as the last bit of the shift register 21a. For reasons to be pointed out below input data which is a binary "1" is stored in the shift register 21a as a binary "0". When a binary "0" is shifted into the flipflop D, its $\overline{Q}$ output will be a "1". Thus, the $\overline{Q}$ outputs of flipflops D and D′ are the D inputs to flipflops C and C′. On the next shift this "1" will be at the D input of flipflop C and will become a "1" at its output. It will continue as a "1" as it is shifted through stages B and A but, upon leaving stage A, it becomes a "0" again since the output to the shift register 21a from flipflop A is taken from the $\overline{Q}$ rather than the Q output. Also, the location jump gating 35 shown on FIG. 1 is not required in this embodiment since a shift register 21a which is capable of selecting as its input either line 146 or 148 in response to a signal on line 144 is utilized. In other words, the gating is internal in the shift register. Thus, in order to carry out the jump function, the $\overline{Q}$ output of the flipflops B and B′ are also provided as inputs on lines 148 to the shift registers 21a.

Operation will be explained starting with the initialization. Switch 53 is used to couple a ground of "0" input to either one of two NAND gates 116 and 118. A resistive network 119 coupled to a high or logical "1" voltage maintains the input to the other at a logical "1". When switch 53 is placed in the calibrate position, assuming that the switch 55 is open so as not to inhibit initialization, a one shot 120 is fired. Its $\overline{Q}$ output goes from "1" to "0" for at least two shift register cycles. The $\overline{Q}$ output of one shot 120 is the D input to a flipflop 250. This flipflop obtains as its clock input the $\phi_3$ signal. Thus, on the next $\phi_3$ pulse its Q output becomes a "0". This "0" is fed to the preset inputs of the flipflops A and A′ causing "1" to preset therein i.e., at their Q outputs. As explained above, the clock in the form of the pulses $\phi_5$ for the bipolar flipflops A – A′ to D – D′ and in the form of the signal $\phi_1$ for the MOS shift register 21a clocks these "1's" through the whole shift register so that it eventually, fills with "1's". The $\overline{Q}$ outputs of the flipflops A and A′ are inputs to a NOR gate 238, the $\overline{Q}$ outputs of flipflops B and B′ to a NOR gate 240, the $\overline{Q}$ outputs of flipflops C and C′ to a NOR gate 242 and the Q outputs of the flipflops D and D′ to a NOR gate 244. (Q outputs are used because of the "0" – "1" reversal noted above.) A NOR gate will have a "1" output only when both inputs are "0". The respective $\overline{Q}$ outputs will be "0" only when the Q outputs are "1". Thus, when the flipflops B, B′, C, C′, and D, D′ all are loaded with "1s" a "0" in the D and D′ flipflops representing an actual "1", there will be "1s" outputs from all of the gates 240, 242 and 244 (FIG. 2b). These outputs of gates 240, 242 and 244 are inputs to NAND gate 246. NAND gate 246 has an additional enabling input from NOR gate 256 which is wired as an inverter and which in turn obtains its input from NAND gate 254 having as inputs the output of the flipflop 250 and the clock signal $\phi_3$. Each time the $\phi_3$ signal appears there will be two "1s" at the input of NAND gate 254 and its output will go to "0". This in turn will appear as a "1" out of NOR gate 256. If the outputs of gstes 240, 242 and 244 are also "1" indicating that the "1s" have circulated around and filled the stages B, C and D of the shift register, the output of NAND gate 246 will become a "0". This "0" provides a reset as long as there are "1s" in the stages B, C, D and B′, C′ and D′. Now, as explained above, the shift register begins to fill with "0s". However, as soon as the first "0s" reach the flipflops D and D′ (FIG. 2i), the output of gate 244 will become a "0" and the output of gate 246 a "1", removing the reset input. The output of gate 244 is inverted through a NOR gate inverter 258 the output of which is one input to a NAND gate 248 having as its other inputs the outputs of gates 238, 240 and 242. These gates will still have "1" outputs since there are still "1s" in each of the flipflops A – A′, B – B′ and C – C′. Thus gate 248 responds to the condition shown in FIG. 2i so as to have a "0" output. On the next $\phi_3$ clock pulse this "0" output of gate 248 is loaded into flipflop 252 whose Q output then becomes a "0" and this "0" is coupled to reset the flipflops C – C′ and D – D′. The result will be as shown on FIG. 2j, keeping in mind that a "0" in flipflops D and D′ actually represents a data "1" because of the way they are interconnected. The reason for this is that it permits using a package of four bipolar flipflops with a common reset line. With respect to flipflops 250 and 252, note that they had been loaded with "1s" at their Q outputs by the "1" outputs from one shot 120 and gate 248 respectively before the outputs of one shot 120 and gate 248 changed as described above.

INPUT OF DATA

Figure 2J:
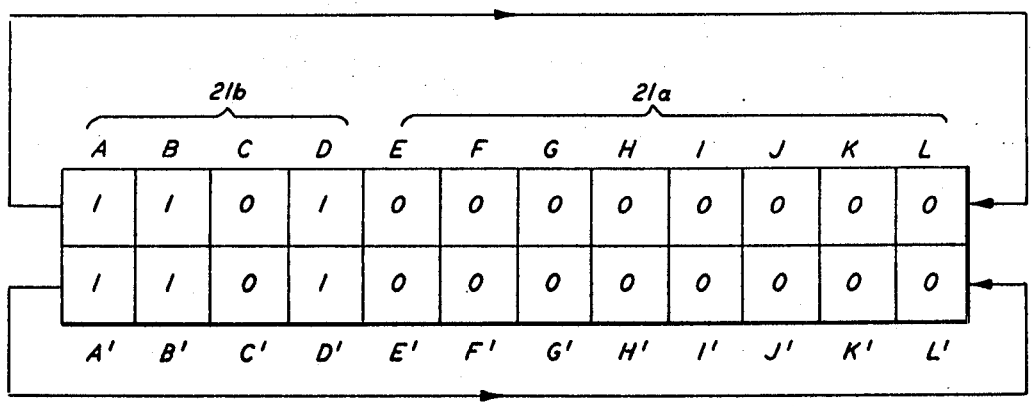

With the configuration on FIG. 2j obtained, the index marker and location marker have been established with the proper relationship and data can now be loaded. The analog input from the instrument is coupled through an appropriate resistor to an integrator 194 comprising an amplifier 204 with a capacitor in its feedback path. Coupled across the capacitor is a switch in the form of a field effect transistor for resetting the integrator. Integrator 194 begins to integrate the error. Its output is coupled respectively to the non-inverting input of an amplifier 202 and the inverting input of an amplifier 200. These amplifiers are utilized in conjunction with a resistor divider network 204 to act as comparators. One acts as a comparator in the positive direction and other in the negative direction. Both have diode limiting on their outputs so as not to place too high a voltage on the digital hardware which follows them. The resistor divider network is set so that the comparators 196 and 198 respond to the analog increment which is set equivalent to a digital "1" either positive or negative. Positive errors are detected at the comparator 198 and negative errors at the comparator 196. The output of comparator 198 is an input to NAND gate 176 and the output of comparator and input to NAND gate 174. These NAND gates are enabled by a signal from NAND gate 116, part of the latch of the mode selection circuit. Thus, if one of the comparators detects a positive or negative error, and assuming that the system is still in the calibration mode and there is a "1" output from the gate 116, one of the gates 174 and 176, depending on the direction of the error, will have an output which goes to "0". The outputs of gates 174 and 176 are respective input to gates 186 and 188 which are both NOR gates. These NOR gates are enabled by the output of gate 268. As previously explained, it is necessary that input data be loaded into the locations B–B'. This enabling signal accomplishes this. Before explaining the manner in which the signal, which is designated on the diagram $\overline{M\phi_4}$, is obtained from gate 268 it should be noted that the outputs of gates 186 and 188 are respectively inputs to gates 180 and 184. Gate 180 is coupled to the preset input of flipflop B' and gate 184 to the preset input of flipflop B. The outputs of gates 186 and 188 are also coupled respectively inputs of gates 182 and 178. The outputs of these gates are connected to the respective reset inputs of the flipflops B and B' and are used to reset the one of the flipflops in which a "1" is not being loaded in case there is already data stored therein. The manner in which these gates are enabled will be explained in greater detail below. For now, assume that they are enabled. It is proper to load data into B and B' when the location marker is in C and C'. The location marker will be in C and C' when there are "1s" in both of those locations but not both "1s" in either D and D' or B and B' since this latter condition would indicate that it was the index marker rather than the location marker which was present. Thus, the output of gate 242 which is indicative of C and C' is coupled into a NAND gate 268. The second two inputs into NAND gate 268 are the outputs of gates 262 and 266, both NOR gates which have inputs respectively the outputs of gates 240 and 244. All of the gates 260, 262, 264 and 266 are enabled by the $\phi_4$ signal. The gates 262 and 266 have as respective inputs the B – B' signal from gates 240 and D – D' signal output from gate 244. Thus the outputs of these gates will indicate the situation not i.e. $\overline{B \cdot B'}$ and $\overline{D \cdot D'}$. Thus, if $\overline{B \cdot B'}$ is a "1" and if $\overline{D \cdot D'}$ is a "1" but C · C' is a "1", during $\phi_4$ there will be all "1" inputs to gate 268 and it will have a "0" output. This "0" output then enables the gates 186 and 188 so that input data may be loaded.

LOCATION MARKER JUMP

The marker jump operates the same way whether reading data in or reading data out. The wavelength step signal from the instrument 11 is the clock input to flipflop 274 which always has a high ("1") signal on its data input. This, when a wavelength step occurs, the Q output of flipflop 274 becomes a "1". This "1" then appears at the D input of flipflop 272. Flipflop 272 is clocked by the output of a NOR gate 282. NOR gate 282, in turn, has inputs from NOR gates 276 and 278. NOR gate 276 has as one input the output of gate 268 described above which will provide an output signal during $\phi_4$ timing signal when the location marker is in the C and C' locations. Gate 270 similarly provides an output when the location marker is in the B and B' locations. To accomplish this, it has one input taken directly from NOR gate 240 and other inputs from NOR gates 264 and 260, to distinguish between the location marker and index marker. Gate 276 is enabled by an exclusive OR gate 170. Exclusive OR gate 170 has one input from the step direction signal out of the instrument and its other input from the $\overline{Q}$ output of flipflop 166. The Q output of flipflop 166 along with the step direction signal are inputs to the exclusive OR gate 172 the output of which is the enabling input to gate 278. Flipflop 166 is normally reset and its $\overline{Q}$ output will be a "1", i.e. it is reset by the "0" output of latch gate 118 during calibration. Since calibration is always done when starting, each time the system is used flipflop 166 will be initially reset. Thus, normally, gate 170 will have a "1" output unless the step direction signal is also a "1". On the other hand, the Q output of flipflop 166 will be a "0", and the output of exclusive OR gate 172 will remain at "0" except when a step direction signal appears, at which time its output will become a "1". The step direction signal is a "0" for a forward step and a "1" for a backward step. Thus, with the flipflop 166 reset gate 176 will be enabled for steps in the forward direction and gate 278 for steps in the backward direction. Under normal conditions the outputs of gates 276 and 278 are both "0" and the output of gate 282 is a "1". Assuming moving in the forward direction and the "0" input on the step direction signal, the output of gate 172 will be a "0" and the output of gate 170 a "1". The result of this is that when the output of gate 270 becomes "0" there will be two "0s" at the input of gate 278 and it will have a "1" output causing the state of gate 282 to change to clock the flipflop 272 causing the "1" at the Q output of flipflop 274 to appear at the Q output of flipflop 272. This will occur when the location marker is in the B – B' location i.e. there will be all "1s" at the input to gate 270. The signal from the Q output of flipflop 272 is the input 144 to the shift register sections 21a telling them to take their input from the input 148 instead of 146. Referring again to the timing diagram it is noted that the output at gate 270, because of the $\overline{\phi}_4$ input to the gates 260, 262, 264 and 266 will not appear until the $\overline{\phi}_4$ pulse appears. This occurs after data has been read into sections 21a by the $\phi_1$ pulse. The condition detected which set the flipflop 272 is the condition illustrated by FIG. 2b. Again referring to the timing diagram of FIG. 3 the next timing pulse to occur is $\phi_5$. This results in all the data in the section A, A' to D, D' being shifted one position to the left to result in the configuration shown on FIG. 2c. Now the pulse $\phi_1$ occurs again and the configuration shown on FIG. 2d takes place. I.e., the data in the section B of the shift register is read into the sections 21a. The Q output of flipflop 272 is the data input to flipflop 168. On the next clock pulse $\overline{\phi}_4$, the "1" present there is read into flipflop 168 and its Q output goes to "0" resetting flipflops 274 and 272. Its Q output, as was mentioned above, is the enabling input to gate 164 from which the $\phi'_5$ timing signal is derived. With this signal now a "1" the gate is disabled and, as explained above, the next $\phi'_5$ pulse suppressed so that the configuration of FIG. 2e is attained on the next $\phi_5$ pulse with the location market in the A - A' flipflops. Since the flipflop 272 has been reset, on the next $\overline{\phi}_4$ pulse, flipflop 168 is reset to remove the suppression so that data can again advance through all stages of the shift register in normal fashion. Furthermore, since flipflops 272 and 274 have been reset, data from A - A' will go into the sections 21a of the shift register on lines 146. Circulation will continue in this manner until another wavelength step signal is received.

Now, assume that the step direction signal is reversed and becomes a "1." Again remember that the flipflop 166 is reset having a "1" and its $\overline{Q}$ output and a "0" at its Q output. Thus, there will be two "1s" at the input of exclusive OR gate 170 and it will have a "0" output. There will only be a single "1" at the input to exclusive OR gate 172 and it will have a "1" output. Now, it is the gate 276 which will respond to the signal from gate 268 indicating that the location market is in the C location. Again, the flipflop 272 will be set by the signal from gate 82 when this occurs. This in turn will enable the shift register sections 21a to receive data from the $\overline{Q}$ outputs of the sections B and B'. On the next advance of the bipolar portion of the shift register the "1" of the location marker previously in C and C' will be moved to B and B' to take on the configuration shown in FIG. 2b. Now when the $\phi_1$ signal occurs the location marker will be loaded into the shift register sections 21a jumping over the data in location A - A'. Once again the flipflop 168 will act to reset flipflops 272 and 274 and to disable gate 164 to suppress the $\phi'_5$ signal for one clock cycle so as to permit the data to advance.

THE OUTPUT CIRCUITS

As explained above data is output continuously between the index marker and location marker. This means that the index marker must be detected and data output started at that time and the location marker detected and data output terminated at that time. It has been seen that the gates 268 and 270 will identify the location marker. Thus, all that is needed is something to identify the index marker. This is accomplished by NAND gate 271. NAND gate 271 has as inputs the outputs of gates 238 and 240 and the outputs of gate 264; thus, gate 271 will have an output which goes from "1" to "0" when the index marker is in the sections A - A' and B - B' and there is not a pair of ones in C - C' during the occurance of the $\overline{\phi}_4$ timing pulse. In other words it identifies the index marker. The output of gate 271 is used to set a latch made up of a cross coupled NAND gates 134 and 136. This latch is, in turn, reset by the output of gate 268 indicating that the location marker is at C - C'. The output of gate 134 is an enabling input to NOR gates and 122 and 126. These gates have their outputs coupled respectively to the data inputs of flipflops 130 and 132. These flipflops are clocked by the $\phi_3$ signal. The second inputs to gates 122 and 126 are from gates 124 and 122 respctively, both NAND gates. Gate 122 has as a first input the $\overline{Q}$ output of flipflop B and gate 124 as its first input the $\overline{Q}$ output of flipflop B'. The second input to gate 122 is the Q output of B and second input to gate 124 and Q output of B'. Gate 122 will thus have a "0" output when B has a Q output of "1" and there is a "0" in B'. Similarly gate 124 will have a "0" output when there is a "1" in B' and a "0" in B. If there is a "1" in both B and B' there will be an output from neither gate. This enables these gates to distinguish between data and an index or location marker. A "0" at gate 122 or 124 is converted to "1" in the gate 126 or 128 when those gates are enabled. Then, on the next $\phi_3$ pulse a "1" at one of these gates will be set into the flipflops 130 and 132. Thus, referring to FIG. 2f for example, at the occurrence of the $\phi_3$ pulse, when the data shown at B - B' is present, with the gates 126 and 128 enabled the output of gate 122 will be a "1" and the output 124 a "0". The output of gate of 126 will be a "0" and the output of gate 122 a "1." Thus, a "0" will be loaded into the flipflop 130 and a "1" into the flipflop 132. After one step of the clock advancing the data, that step occurring on the $\phi_5$ pulse, there will be the two "0s" which were formerly in C and C' in B and B'. Now these "0" will be loaded into both flipflops 130 and 132. The outputs of flip-flops 130 and 132 are coupled as inputs to a differential amplifier 142, the output of flipflop 130 being coupled through a resistor into the inverting input and the output of flipflop 132 through a resistor to the non-inverting input. If both inputs are "0", the amplifier will have a "0" output. If there is a binary "1" from the flipflop 130 then a positive output will appear and if there is a binary "1" on flipflop 132 a negative output will appear. This output is coupled through a low pass filter which will average the signals occurring between the index marker and the location marker to result in an average corresponding to the error at the point where the location marker is. By using incremental data and continuously circulating it, reading out the data between the index and location marker and averaging it through a low pass filter, a digital to analog conversion is carried out in a very simple fashion. The waveforms resulting from this digital to analog conversion of the data shown on FIG. 2f are illustrated on FIGS. 5a, b, and c. FIG. 5a shows the nature of the pulses which are input to the amplifier 142 and FIG. 5b the output of the filter. FIG. 5c show the filter output as a function of the number of steps i.e. the number of storage positions of FIG. 2f which are averaged. Because of the high rate of circulating in the register and the filtering effect of the low pass filter, only this final value shown on FIGS. 5b and c will appear on line 19.

DATA INPUT TIMING

The manner in which data input timing is accomplished and in which it is prevented that two "1" are stored when correcting data will now be explained. The outputs of the flip-flops 130 and 132 are used as inputs to gates 178, 180, 182 and 184. The Q output of flipflop 130 is an input to gate 182 and the Q output of flipflop 132 is an input to gate 178. The two Q outputs are also combined in a NOR gate 190 which provides inputs to gates 180 and 184. Assume that sufficient error has accumulated to trigger one of the comparators 196 and 198. Assume that it is comparator 198 and that two "1s" now appear at the input of gate 176 so that it has a "0" output. When the output of gate 268 becomes a "0," indicating that the location marker is in the C - C' flipflops, and thus, data can be loaded in the B - B' flipflops, the output of gate 188, having two "0" inputs will now become a "1". If the output of gate 194 is a "1", there will be two "1s" at the input of gate 184 and its output will become a "0" presetting a "1" into flipflop B. The output of gate 194 will be a "1" only if both its inputs are "0" i.e. only if the data in B and B' is both "0". During initial calibration this should be the case. However, during the recalibration mentioned above it is possible that there will be a "1" stored in B' for example (if there is a "1" in B it really doesn't matter since that is what is being put back in) A "1" in B' would have caused a "1" from the Q output of flipflop 132. Note that these flipflops are set by the $\phi_3$ pulse which occurs before the $\phi_4$ pulse which enables the gates 186 and 188. The "1" in flipflop 132 will cause the output of gate 190 to be a "0" and will prevent a "1" from being set in B. However, this "1" is also an input to gate 178. When a second "1" appears from gate 188 its output will become "0" and will reset B'. Now the output of gate 194 will change to a "1" and the output of gate 184 to a "0" to load a "1" into B. In similar fashion, if there is an attempt to load a "1" into B' and there is already a "1" in B, the "1" in B will first be reset by gate 182 after which gate 190 will enable gate 180 to preset the "1" in B'. The outputs of gates 188 and 186 are inputs to NOR gate 192. Whenever a comparison results on the occurence of the output of gate 268, one of these gates will have an output going from "0" to "1". Thus, the output of gate 192 is normally a "1". If there is data being input and the output of either gate 186 of gate 188 changes its output goes to "0". This output is used to fire a one shot multivibrator 208 which resets the integrator 194 by shorting out its capacitor across the field effect transistor 206. This insures that the input data is of an incremental nature. The integrator 194 accumulates error until the error reaches the value assigned a digital "1". At the point the digital "1" is loaded into the shift register and the integrator reset. As will be seen below, it is preferred that when calibrating or, before beginning to step the wavelength or other variable ahead, that the instrument be zeroed so that there is initially no error. Otherwise, a series of "1s" will be loaded into the shift register until the pre-existing error is cancelled out. Over this range the correction will not be accurate.

BELOW RANGE OPERATION

As was pointed out above, the calibration need not be started at an end point of the instrument. Any arbitrary limit may be chosen. This means that in operation it is possible to operate the instrument below the range over which it is calibrated. In order to prevent loss of synchronism with the step signal when going below the calibration range a "bounce" feature is incorporated in the system of the present invention. If the instrument is stepped down it will eventually reach the condition shown in FIG. 2b. After one further step the index marker will be directly adjacent the location marker as shown in FIG. 2a. At this point, the gate 248 will have all "1s" at its input since there will be "1s" in both of the A flipflops, in both of the B flipflops and both of the C flipflops. In the D - D' flipflops there will be either two "0s" or a "1" and a "0". Since NOR gate 258 is wired as an inverter it will have a "1" at its output if its input is a "0". This input is obtained from NOR gate 244. It will have a "0" output at any time except when its two inputs are "0". Thus, when the configuration of FIG. 2i occurs the output of gate 248 will change to a "0" and on the next $\phi_3$ pulse this "0" will be loaded into flipflop 252. This will reestablish the condition shown on FIG. 2j and will at the same time clock flipflop 166 which is no longer being held reset. Its $\overline{Q}$ output is coupled back to its data input and when the clock pulse appears its Q output will change to a "1".

Figure 2K:
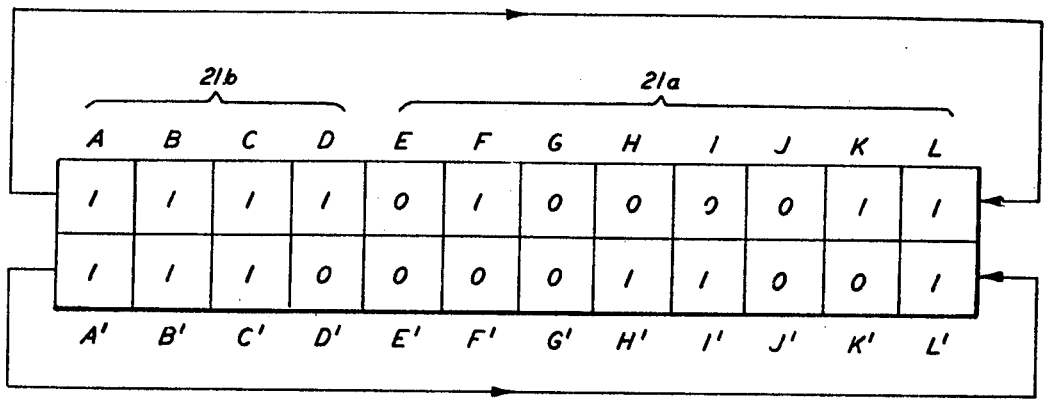
Figure 2L:
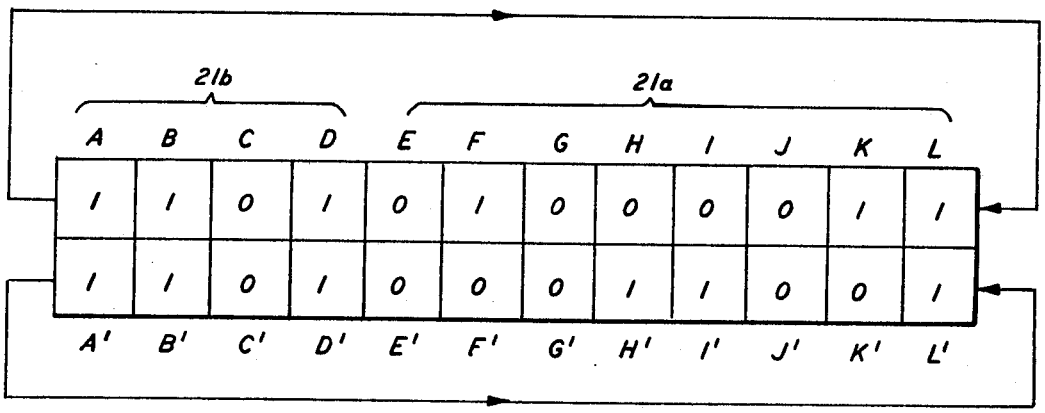
Figure 2M:
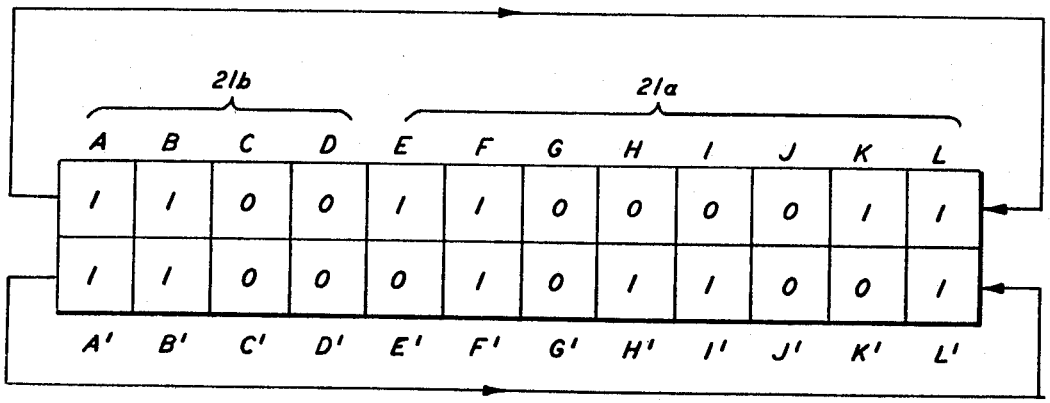
Figure 2N:
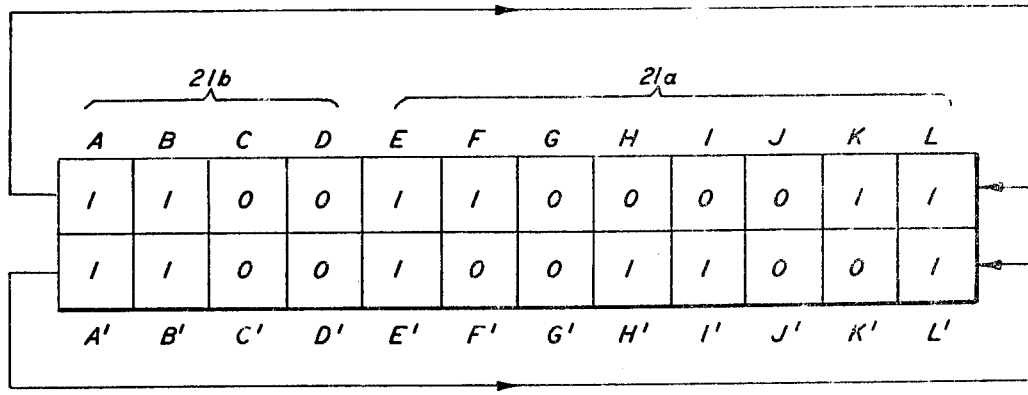
Figure 2O:
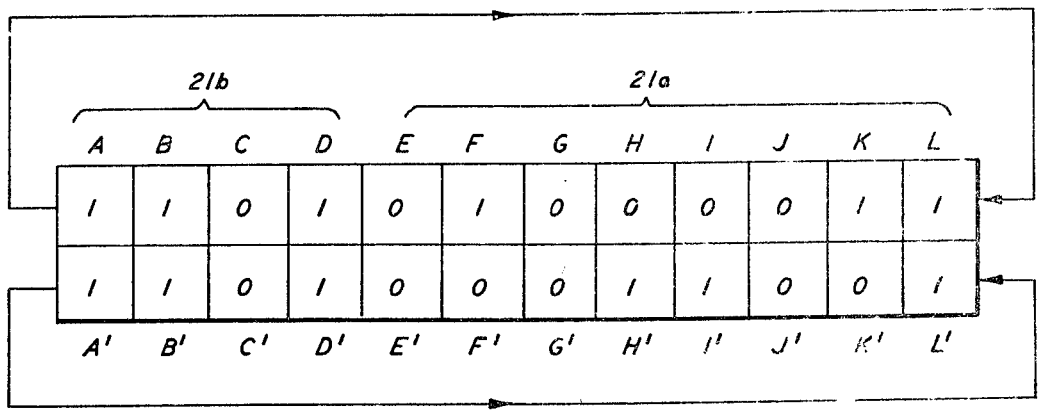
Figure 2P:
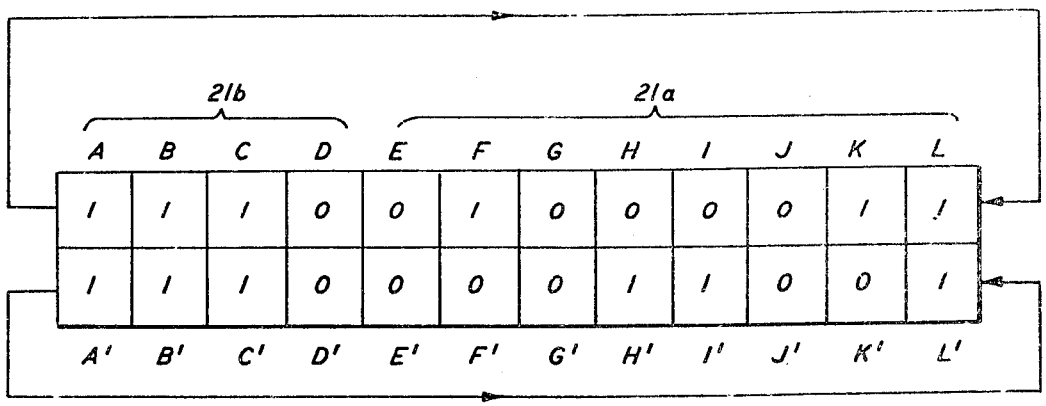

Now, the inputs to the exclusive NOR gates 172 and 170 are reversed. This, in turn, reverses the direction of the stepping. Now, while stepping downward the location marker moves away from the index marker and when stepping upward it moves toward the index marker. When the step signal is again stepped up to the point of calibration the configuration of FIG. 2i again results and the same thing happens again except now, since the flipflop 166 was set with a "1" at its Q output, the "0" at its $\overline{Q}$ output is read in when it is clocked and the system restored to normal operation. Normally, if the system is zeroed at the initial point, the D–D' location of FIG. 2i will contain two "0" and there will be no loss of data. However, with the resetting just described, any data which was stored in the D–D' of FIG. 2i will be lost upon reversing. There will be no further loss of further re-reversing to resynchronize since it will be these two "0" which then appear in the D–D' flipflops. This is illustrated by FIGS. 2k – 2p. Once the situation shown in FIG. 2k is reached the bounce reset just described is carried out so that the data takes on the configuration shown in FIG. 2l (the same data pattern assumed in FIG. 2a is being used herein). Then the location marker begins to move away from the index as shown by FIG. 2m at a point where it has made two jumps. In FIG. 2n it is shown moving back toward the index marker until finally in FIG. 2p it is back adjacent the index marker. The reset referred to above takes place and the configuration is again as shown on FIG. 2k. In each case the configuration after the $\phi_1$ timing signal and before $\phi_5$ is shown. I.e., the data overlap is between A–A' and L–L'.

RECALIBRATION

During recalibration the same things happen as happens during initial calibration except that the one shot 120 is not utilized to carry out initialization. To prevent this, the switch 55 is closed to disable the one shot from outputting a pulse when the switch 53 is moved from the run to the calibrate position. Thus, at any position while operating the instrument a recalibration can be carried out simply by throwing the switch into the calibrate position and feeding back the error. As mentioned above, the gating arrangement including the gates 178–184 insure that two "1" are not loaded into a data location.

We claim:

1. In an error correcting system in which error corrections for each of a plurality of steps of an independent variable in a device which has error dependent upon the independent variable are stored in a storage means in adjacent storage positions thereof and wherein a location marker differing from any stored correction value is also stored in said storage means and moved as said device steps so as to always be adjacent the correction corresponding to the step of the device said correction values being stored for a range of the device between a first limit and a second limit, the device having a greater overall range than the range between said first and second limit and being able to go to a position below said first limit, a method of preventing a loss of synchronization between the device and the location marker if the device is moved below said first limit by steps comprising detecting when said location marker reaches said first limit and causing it to move in a direction from said first limit toward said second limit as said device is moved below said first limit and in a direction toward said first limit as said device is moved from below said first limit back toward said first limit and again reversing the direction of movement of said location marker when said first limit is again reached with said independent variable moving in a direction toward said second limit whereby synchronizaton will be maintained even when going below the range for which correction values are stored.

2. In a device having an independent variable which can be changed at least between a first lower limit and a second upper limit the device having a greater overall range than the range between said first and second limits and is able to go to a position below said first limit, the device having an error which is a function of the value of the independent variable, a method of correcting the error comprising the steps of:
 (a) storing, in a plurality of adjacent data storage positions, a correction value for each of a plurality of increments of the independent variable between said first and second limits and also storing a location marker which is different from any correction value;
 (b) initializing the device at said first limit;
 (c) while said device is initialized at said first limit locating said location marker so as to be adjacent the correction value for the first increment of said independent variable from said first limit toward said second limit; and
 (d) upon movement of said independent variable through an increment, moving said location marker so as to be adjacent the stored correction value for the next increment;
 (e) reading the error correction value corresponding to the incremental position of the device and providing said value as a correction to said device; and
 (f) detecting when said location marker reaches said first limit and causing it to move in a direction from said first limit toward said second limit as said device is moved below said first limit and in a direction toward said first limit as said device is moved from below said first limit back toward said first limit and again reversing the direction of movement of said location marker when said first limit is again reached with said independent variable moving in a direction toward said second limit whereby synchronization will be maintained even when going below the range for which correction values are stored.

3. The method of claim 2 wherein said device is an analytical instrument.

4. The method of claim 3 wherein said device is a spectrophotometer.

5. In a device having an independent variable which can be changed at least between a first lower limit and a second upper limit the device having a greater overall range than the range between said first and second limits and able to go to a position below said first limit, the device having an error which is a function of the value of the independent variable, apparatus for correcting the error comprising:
 (a) means having a plurality of data storage positions for storing, in adjacent data storage positions thereof, a correction value for each of plurality of increments of the independent variable between said first and second limit and also storing a location marker which is different from any correction value;
 (b) means for initializing the device at said first limit;
 (c) means for positioning said location marker so as to be adjacent the correction value for the first increment of said independent variable from said first limit toward said second limit while said device is initialized at said first limit;
 (d) means for moving said location marker so as to be adjacent the stored correction value for the next increment upon movement of said independent variable through an increment;
 (e) means for reading the correction value corresponding to the incremental position of said device and providing said value as a correction to said device; and
 (f) means to detect said location marker at said first limit and moving in a direction below said first limit and to cause said location marker to reverse its direction of movement for as long as said device is below said first limit.

6. The apparatus of claim 5 wherein said device is an analytical instrument.

7. The apparatus according to claim 6 wherein said device is a spectrophotometer.

8. Apparatus according to claim 5 wherein said device provides an output indicative of its direction of movement forward or backward, wherein said means for storing comprising a shift register, an index marker also stored in said shift register in a position adjacent the correction value for said first increment on the side opposite said location marker, and wherein said means moving said location marker comprise means to cause said location marker to jump over one storage position in a direction toward said index marker when said direction signal from said device indicates a step in their backward direction and to jump over one storage position in a direction away from said index marker when said direction signal from said device indicates a step in the forward direction and further including:
 (a) a clock having at least first and second outputs spaced in time with respect to each other for continuously circulating the data in said shift register at a rate much greater than the rate of change of said independent variable;
 (b) means to detect said index marker and means to detect said location marker at a fixed point in said shift register during each cycle;
 (c) said shift register comprising:
  (1) a first shift register section having at least four stages;
  (2) a second shift register section having a plurality of stages such that the number of stages in said first and second sections are at least equal to the number of incremental steps of said device over which error correction is required, an output of the last stage of said first section coupled as an input to the first stage of said section and an output of the last stage of said second section coupled as an input to the first stage of said first section; and
  (3) third and fourth shift register sections identical respectively to said first and second shift register sections and coupled to each other in the same manner as said first and second sections, corresponding positions in said first and second sections and said third and fourth sections constituting data position of two bits each, said first and third sections being coupled to be clocked by said first clock signal and said second and fourth sections by said second clock signal;

(d) said means to detect said index marker coupled to detect said index marker in the third and fourth stages of said first and third shift registers; said means to detect said location marker coupled to detect said location marker in said third stage of said first and third shift registers;

(e) further means to detect said location marker in said second location of said first and third shift register sections;

(f) first and second gating means having their inputs coupled to the output of said third stage of said first and second shift registers respectively and their outputs to the reset and preset inputs of said first and second stages of said first and second shift register respectively;

(g) said means for moving comprising:
 (1) means to disable coupling of said fourth stage of said first and third sections to said first stage of said second and fourth sections respectively and to enable instead the coupling of said third stages of said first and second shift register sections to said second and fourth sections respectively in response to a jump command;
 (2) means for generating a jump command in response to an output from said means for detecting said location marker, an output indicative of a step by said device and an output indicating forward direction from said device and also generating a jump command upon an output from said further means to detect, said step indication from said device and a reverse output signal from said device; and
 (3) means for suppressing the clock pulse supplied to the fourth stage of said first and second shift register which occurs immediately after transfer of data from said third stage of said second and fourth stages;

(h) means to determine when said location marker is at said first limit and to provide an output indicative thereof; and (i) means responsive to said output of said means to determine and to said output from said device indicative of direction of movement and providing an output to cause said means for moving said location marker to reverse its direction of jumping upon detection of a backward direction of movement and a signal from said means for detecting said location marker at said first limit.

* * * * *

UNITED STATES PATENT AND TRADEMARK OFFICE
CERTIFICATE OF CORRECTION

PATENT NO. : 4,080,658
DATED : March 21, 1978
INVENTOR(S) : Larkin B. Scott & John J. J. Staunton It is certified that error appears in the above-identified patent and that said Letters Patent are hereby corrected as shown below:

Column 1, line 57, change "erronous" to --erroneous --.

Column 2, line 58, change "maintining" to -- maintaining --.

Column 4, line 3, change "siganl" to -- signal --.

Column 4, line 14, cahnge "wil" to -- will --.

Column 8, line 36, change "it" to --its --.

Column 9, line 68, after " "O" " insert -- and remains at "O" --.

Column 10, line 10, change "1's" to --"1s" --.

Column 10, line 15, change - 1" to -- "1" --.

Column 10, line 31, change "gstes" to -- gates --.

Column 12, line 39, change "176" to -- 276 --.

UNITED STATES PATENT AND TRADEMARK OFFICE
CERTIFICATE OF CORRECTION

PATENT NO. : 4,080,658
DATED : March 21, 1978

INVENTOR(S) : Larkin B. Scott & John J. J. Staunton

It is certified that error appears in the above-identified patent and that said Letters Patent are hereby corrected as shown below:

Column 12, line 67, change "I.e.," to -- i.e., --.

Column 13, line 66, change "respctively," to -- respectively --.

Column 15, line 56, change "2a" to -- 2i --.

Column 16, line 34, change"I.e.," to -- i.e., --.

Signed and Sealed this

Nineteenth Day of December 1978

[SEAL]

Attest:

RUTH C. MASON
Attesting Officer

DONALD W. BANNER
Commissioner of Patents and Trademarks